United States Patent Office 2,953,537
Patented Sept. 20, 1960

2,953,537

VINYL HALIDE POLYMER COMPOSITION

William K. McBrien, Painesville, Ohio, assignor to Diamond Alkali Company, Cleveland, Ohio, a corporation of Delaware No Drawing. Filed Oct. 13, 1955, Ser. No. 540,330

6 Claims. (Cl. 260—23)

This invention relates to improvements in electrical insulating materials for conductors and more specifically relates to a plastic insulating composition containing an improved stabilization-plasticization system.

THE PRIOR ART

The use of diverse plastic compositions as electrical insulating materials for general-purpose electrical wiring has increased rapidly in recent years as the flammability and cost have been reduced, and as various of its properties have been improved. Such prior insulating compositions typically include a major proportion of a suitable resin or resins, e.g., vinyl resins, such as vinyl halides, vinyl esters, copolymers of vinyl halides and vinyl esters, and the like. The balance of prior compositions generally comprise minor proportions of various fillers, lubricants, and plasticizers.

In some cases, prior plastic insulating compositions have additionally contained a stabilizer, e.g., carbonate of white lead, a barium-cadmium salt of a fatty acid, and/or an organic phosphite. At times such prior formulations are satisfactory in certain applications and, indeed, in some instances have achieved a degree of commercial acceptance.

However, up to the present invention, there has been no completely satisfactory electrical insulating composition adapted to provide the desired combination of physical and electrical properties under widely varying extremes of temperature, exposure to corrosive atmospheres and vibration. Typical of applications involving such a combination of difficult conditions where a high degree of electrical resistance, retention of elongation, low and high temperature flexibility and fluid impermeability must be maintained for extended periods of time are those embodied by compositions used in insulating hook-up wire for radios, television sets, and in various other electronic devices, and in insulating conductors employed in aircraft engines, and other aircraft electrical system wiring.

OBJECTS

It is to the avoidance of difficulties heretofore encountered that the present invention is directed, a principal object of the invention being to provide a new and improved plastic insulating composition having superior properties which are retained even after aging at elevated temperatures.

It is a further object of this invention to provide an electrical insulating composition having improved physical properties, including excellent retention of elongation and low temperature flexibility.

These and other objects and advantages of the invention will appear more fully from the following description thereof.

THE PRESENT INVENTION

Generally, a composition of this invention comprises, in combination, (1) a major proportion of a resinous material such as a vinyl resin, (2) at least one plasticizer and, (3) a stabilizing system consisting essentially of, in combination, a metallic salt of a fatty acid, an organic phosphite, and an epoxy compound. More specifically, a composition of this invention includes a resinous material, a low temperature plasticizer, the above stabilizing system, a high temperature plasticizer, a filler or extender, and, optionally, a lubricant.

(1) Resinous material

The resinous material comprising the major proportion of a composition embodying the invention may be selected from various vinyl type resins, e.g., vinyl halides, such as vinyl chloride, which is preferred at present; vinyl esters, such as vinyl acetate, or copolymers produced by copolymerization of two or more of the foregoing vinyl compounds, e.g., a copolymer of vinyl chloride and vinyl acetate, vinyl chloride and vinylidene chloride, or an interpolymer of a vinyl halide and another vinyl ester, such as an acrylic compound, e.g., an alkyl methacrylate, or with vinylidene compounds, such as a vinylidene halide.

(2) Plasticizers

The plasticizer or plasticizers employed generally should include at least one high temperature plasticizer adapted to have an effective plasticizing action even at extremely low temperatures. Illustrative of such plasticizers are various polyester plasticizers generally produced by esterification of a polyhydric alcohol with a polycarboxylic acid such as sebacic acid. Illustrative of a preferred polyester plasticizer is a glycol sebacate having an average molecular weight within the range from 2000 to 8000. A suitable commercially available polyester plasticizer is the product "G–25" manufactured by the Rohm & Haas Company.

In practice, it generally is preferred to employ a second plasticizer characterized by low volatility, i.e., a so-called "low temperature plasticizer," adapted to provide proper plasticization even after continued exposure to an elevated temperature. Illustrative of suitable plasticizers of this type are various esters, ketones and ethers. Especially suitable are esters, particularly alkyl esters, of dicarboxylic acids, such as sebacic, azelaic, phthalic and adipic acids, specific illustrative compounds of these types being dioctyl phthalate, di-octyl azelate, iso-octyl azelate, and di-iso-octyl sebacate, the latter being preferred at present.

(3) Stabilization system

The stabilizing system of this invention comprises, in combination, (a) a metallic salt, or salts of the same or differing metals with one or more fatty acids, (b) an organic phosphite, and (c) an epoxy compound. Why such a stabilization system in combination with the other ingredients of this invention provides an insulating material having the superior aging properties, excellent physical and electrical properties found is not clear. However, despite the lack of a precise theoretical explanation, an electrical insulation formulated in accordance with this invention and including the foregoing stabilization system does exhibit significantly improved properties even under widely varying temperatures.

(a) The metallic salt or salts of one or more fatty acids may comprise one or a mixture of various metallic salts of fatty acids such as lauric, stearic, palmitic, linoleic, linolenic and oleic acids. The metallic portion of the molecule desirably comprises two different metals, one preferably being a heavy metal selected from the group consisting of iron, lead, copper, zinc, cadmium, manganese, mercury, cobalt, chromium, and nickel; and the other being an alkaline earth metal selected from the group consisting of calcium, barium and strontium. A preferred type of compound is a barium-cadmium salt of a fatty acid, the specifically preferred compound being barium-cadmium laurate which is available commercially under various trade names, e.g., "Ferro 1820," "Advance BC12," and "Harshaw 128V5."

(b) The phosphite ingredient preferably is an organic phosphite, inorganic phosphites such as alkali metal phosphites, e.g., sodium phosphite, being feasible in some applications where it is not essential to avoid introduction of retainable ionic materials into the composition. While various alkyl phosphites, aryl phosphites, alkaryl phosphites, and aralkyl phosphites, including compounds such as di-2-ethylhexyl hydrogen phosphite, tributyl phosphite, trihexyl phosphite, tricresyl phosphite, tri-iso-octyl phosphite, tri-2-ethyl hexyl phosphite, may be used, it has been found especially advantageous to employ alkyl aryl phosphites such as the commercially available trade name products, "Ferro 903," "Harshaw 8VI," and "Advance CH 20," a preferred type of phosphite is one having the formula $$(RO)_3P$$

wherein R is the hydrocarbon radical of a monohydric phenol of the formula ROH.

(c) The epoxy compound, characterized by at least one active

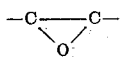

grouping, and preferably also by at least one active hydroxy grouping and at least one ether linkage, generally comprises a condensation polymer; either a resinous material or an epoxidized oil or fatty acid ester being typical of suitable materials.

Illustrative of a suitable epoxy resin is the material having the following structure:

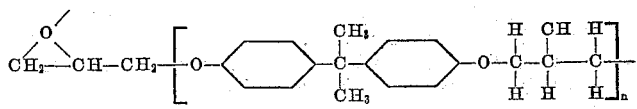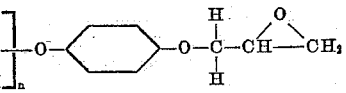

Other suitable epoxy materials include alkyl epoxy fatty acid salts such as alkyl epoxy stearates, laurates, oleates, and the like. A specific compound of this type is octyl epoxy stearate having an epoxide content of 3.2%. Those skilled in the art will recognize that certain epoxy compounds have plasticizing properties. When such materials are employed as sources of the epoxy compounds, it may be advantageous to reduce the amounts of the other plasticizers employed.

From the foregoing description of the stabilization system, it will be understood that a preferred combination includes a mixture of metallic salts of a fatty acid, an aryl phosphite and an epoxy compound. An illustrative combination comprises barium cadmium laurate, an aryl phosphite and an epoxy compound, e.g., the combination of the commercially available products, Ferro 1820, Ferro 903 and Ferro 900.

ADDITIONAL OPTIONAL INGREDIENTS

It will be understood, of course, that varying amounts of fillers, pigments, dyes, or extenders, and the like, such as clays, Burgess #30 Clay being a preferred filler, barytes, diatomaceous earth, powdered spent catalysts, titania, whiting, carbon black, and various other inorganic materials also may be included.

Also, an extrusion or mold lubricant such as a wax, oil, paraffin or the like, may be included.

In order that those skilled in the art may more completely understand the present invention and the preferred methods by which the same may be carrier into effect, the following specific examples are offered:

EXAMPLE I

To illustrate the improvement over similar plastic compositions stabilized with basic carbonate of white lead obtained by the practice of this invention, two compositions were prepared and subjected to identical standard test procedures. The formulation and test results are indexed comparatively as follows:

|  | #1 Parts by weight | #2 Parts by weight |
|---|---|---|
| Ingredients: |  |  |
| Polyvinyl Chloride | 100.0 | 100.0 |
| Clay (Burgess No. 30) | 5.0 | 12.0 |
| Basic Carbonate of White Lead | 7.0 |  |
| Paraffin | 0.1 |  |
| Polyester Plasticizer (Rohm & Haas G-25) | 19.0 | 19.0 |
| Di-iso-octyl Sebacate | 39.0 | 39.0 |
| Barium Cadium Laurate (Ferro 1820) |  | 1.0 |
| Aryl phosphite (Ferro 903) |  | 1.0 |
| Epoxy Compound (Ferro 900) |  | 4.0 |
| Physical Properties (initial): |  |  |
| 100% Modulus (p.s.i.) | 1,29 | 1,320 |
| Tensile break (p.s.i.) | 2,250 | 2,150 |
| Elongation, percent | 335 | 300 |
| Hardness (Shore "A"—10 sec.) | 81 | 79 |
| Brittleness (° C.) | −41.6 | −37.6 |
| Physical Properties (after aging 24 hours at 150° C.): |  |  |
| 100% Modulus (p.s.i.) | 2,700 | 2,260 |
| Tensile break (p.s.i.) | 2,890 | 2,425 |
| Elongation (percent) | 120 | 210 |
| Hardness (Shore "A"—10 sec.) | 100+ | 80 |
| Retention of Elongation (percent) | 35.8 | 70 |

As the above data indicates, the formulation embodying the present invention, exhibits superior aging properties, especially in elongation and retention of elongation, which properties reflect a significant improvement over prior art compositions.

EXAMPLE II

A further series of tests are conducted comprising compositions similar except that one embodies the practice of this invention, and the other omits the essential epoxy compound. The results and formulations are tabulated below:

|  | #1 Parts by weight | #2 Parts by weight |
|---|---|---|
| Ingredients: |  |  |
| Polyvinyl Chloride | 100.0 | 100.0 |
| Clay (Burgess No. 30) | 12.0 | 12.0 |
| Polyester Plasticizer (Rohm & Haas G-25) | 32.0 | 32.0 |
| Di-iso-octyl Sebacate | 26.0 | 26.0 |
| Barium Cadium Laurate (Ferro 1820) | 2.0 | 1.0 |
| Aryl phosphite (Ferro 903) | 1.0 | 1.0 |
| Epoxy Compound (Ferro 900) |  | 4.0 |
| Physical Properties (initial): |  |  |
| 100% Modulus (p.s.i.) | 1,400 | 1,410 |
| Tensile Break (p.s.i.) | 1,950 | 2,080 |
| Elongation (percent) | 235 | 255 |
| Hardness (Shore "A"—10 sec.) | 83 | 80 |
| Physical Properties (after aging 24 hours at 150° C.): |  |  |
| 100% Modulus (p.s.i.) |  | 2,350 |
| Tensile Break (p.s.i.) | 2,800 | 2,500 |
| Elongation (percent) | 110 | 245 |
| Hardness (Shore "A"—10 sec.) | 87 | 80 |
| Retention of Elongation | 46.8 | 96 |

As the data of Examples I and II indicate, compositions of this invention are characterized by a singular improvement in elongation and retention of elongation; the slight decrease in modulus and tensile strength reflected by this data being insignificant in substantially all cases. However, in those instances where it is essential that no reduction in tensile strength and modulus occur, this can readily be accomplished by reducing the total amount of plasticizer present since the modulus and tensile strength vary inversely with the total plasticizer content. Generally, the elongation and retention of elongation are the most important physical properties of a composition subjected to widely varying temperatures, as in electronic equipment circuitry.

PROPORTIONS OF INGREDIENTS

As those skilled in the art will realize, the proportions of the several ingredients, based on the amount of resin employed, e.g., vinyl resin employed, depending on the particular application intended. Using 100 parts of the resin as a basis, advantageous results are obtained when the total plasticizer content comprises about 25 to 100 parts which may include up to 100% of a polyester plasticizer, although it preferably includes 25% to 60% by weight of the total plasticizer, of a so-called "high temperature plasticizer," the balance comprising one or more "low temperature plasticizers." When a filler, such as clay, is employed, it may generally comprise up to 50% by weight of the resin, i.e., up to 50 parts.

In the stabilization system, the metallic salt of a fatty acid may advantageously be present in an amount within the range from 0.25 to 2.5 parts, the phosphite in a quantity within the range from 0.25 to 5.0 parts, and the epoxy compound in an amount within the range from 0.5 to 5.0 parts, larger amounts of the latter being disadvantageous primarily only because of cost considerations.

While particular emphasis has herein been made to insulation for wiring, it should be understood that compositions of this invention are capable of other applications, e.g., electrical tape and insulating sheets, as well as various extruded or molded forms.

It is to be understood that although the invention has been described with specific reference to particular embodiments thereof, it is not to be so limited, since changes and alterations therein may be made which are within the full intended scope of this invention as defined by the appended claims.

What is claimed is:

1. An electrically insulating composition characterized by improved physical properties after continued exposure to elevated temperatures while retaining excellent low temperature flexibility, said composition comprising at least 50% by weight of polyvinyl chloride, up to about 50% by weight thereof of a filler, and about 25 to 100%, based on the polyvinyl chloride content of total plasticizer including 25 to 60% by weight of said total plasticizer of a high temperature plasticizer consisting of a polyester of a glycol and sebacic acid with a molecular weight of approximately 8000, the balance of the plasticizer being a low temperature plasticizer consisting of an alkyl ester of a hydrocarbon dicarboxylic acid and a minor amount of a stabilization system consisting essentially of 0.25 to 2.5 parts of a co-precipitated barium cadmium laurate containing 7.5% cadmium as metal and 15% barium as metal, the fatty acid moiety varying from capric through stearic acid, 0.25 to 5.0 parts of a phosphite of the formula $(RO)_3P$ where R is the hydrocarbon radical of a monohydric phenol of the formula ROH and 0.5 to 5.0 parts of an epoxy compound consisting of a mixture of (1) a resinous condensation product of bis(4-hydroxy phenyl) dimethyl methane and epichlorohydrin with (2) an epoxidized soybean oil plasticizer, the resultant mixture having an oxirane oxygen content of 5.5%.

2. An electrically insulating composition having the composition substantially as follows:

| Ingredient: | Parts by weight |
|---|---|
| Polyvinyl chloride | 100.0 |
| Clay | 12.0 |
| Polyester of a glycol and sebacic acid having a molecular weight of approximately 8,000 | 19.0 |
| A coprecipitated barium cadmium laurate containing about 7.5% cadmium as metal and 15% barium as metal, the fatty acid moeity varying through the range defined by capric through stearic acid | 1.0 |
| Di-iso-octyl sebacate | 39.0 |
| A composition consisting of a phosphite of the formula $(RO)_3P$ where R is the hydrocarbon radical of a monohydric phenol of the formula ROH | 1.0 |
| An epoxy mixture consisting of a mixture of a (1) resinous condensation product of bis(4-hydroxy phenyl) dimethyl methane and epichlorohydrin with (2) an epoxidized soybean oil plasticizer, the resulting mixture having an oxirane oxygen content of 5.5% | 4.0 |

3. An electrically insulating composition having the composition substantially as follows:

| Ingredient: | Parts by weight |
|---|---|
| Polyvinyl chloride | 100.0 |
| Clay | 12.0 |
| Polyester of a glycol and sebacic acid having a molecular weight of approximately 8,000 | 32.0 |
| Di-iso-octyl sebacate | 26.0 |
| A coprecipitated barium cadmium laurate containing about 7.5% cadmium as metal and 15% barium as metal, the fatty acid moeity varying through the range defined by capric through stearic acid | 1.0 |
| A composition consisting of a phosphite of the formula $(RO)_3P$ where R is the hydrocarbon radical of a monohydric phenol of the formula ROH | 1.0 |
| An epoxy mixture consisting of a mixture of a (1) resinous condensation product of bis(4-hydroxy phenyl) dimethyl methane and epichlorohydrin with (2) an epoxidized soybean oil plasticizer, the resultant mixture having an oxirane oxygen content of 5.5% | 4.0 |

4. An electrical conductor insulated with a composition according to claim 1.

5. An electrical conductor insulated with a composition according to claim 2.

6. An electrical conductor insulated with a composition according to claim 3.

References Cited in the file of this patent

UNITED STATES PATENTS

| 2,456,216 | Richter | Dec. 14, 1948 |
| 2,564,646 | Leistner et al. | Aug. 14, 1951 |
| 2,579,572 | Hendricks | Dec. 25, 1951 |
| 2,611,756 | Pockel | Sept. 23, 1952 |
| 2,669,549 | Darby | Feb. 16, 1954 |
| 2,671,064 | Cowell et al. | Mar. 2, 1954 |
| 2,708,215 | Kagenoff | May 10, 1955 |
| 2,716,092 | Leistner et al. | Aug. 23, 1955 |
| 2,752,319 | Lipke et al. | June 26, 1956 |
| 2,789,100 | Wilson | Apr. 16, 1957 |

OTHER REFERENCES

Lally et al.: Stabilization of Polyvinyl Chloride, p. 111–112, 114, 116, 156–162, Modern Plastics, vol. 27, No. 4, December 1949.

Ratti: Vinyl Stabilizers, p. 451–454, India Rub. World, vol. 123, No. 4, January 1951.

UNITED STATES PATENT OFFICE

CERTIFICATE OF CORRECTION

Patent No. 2,953,537 September 20, 1960

William K. McBrien

It is hereby certified that error appears in the printed specification of the above numbered patent requiring correction and that the said Letters Patent should read as corrected below.

Column 3, line 70, for "carrier" read -- carried --; column 4, in the table of the top of the column, second column thereof and opposite "100% modulus (p.s.i.)" for "1,29" read -- 1,290 --.

Signed and sealed this 11th day of April 1961.

(SEAL)
Attest:

ERNEST W. SWIDER
Attesting Officer

ARTHUR W. CROCKER
Acting Commissioner of Patents